Figure 1:
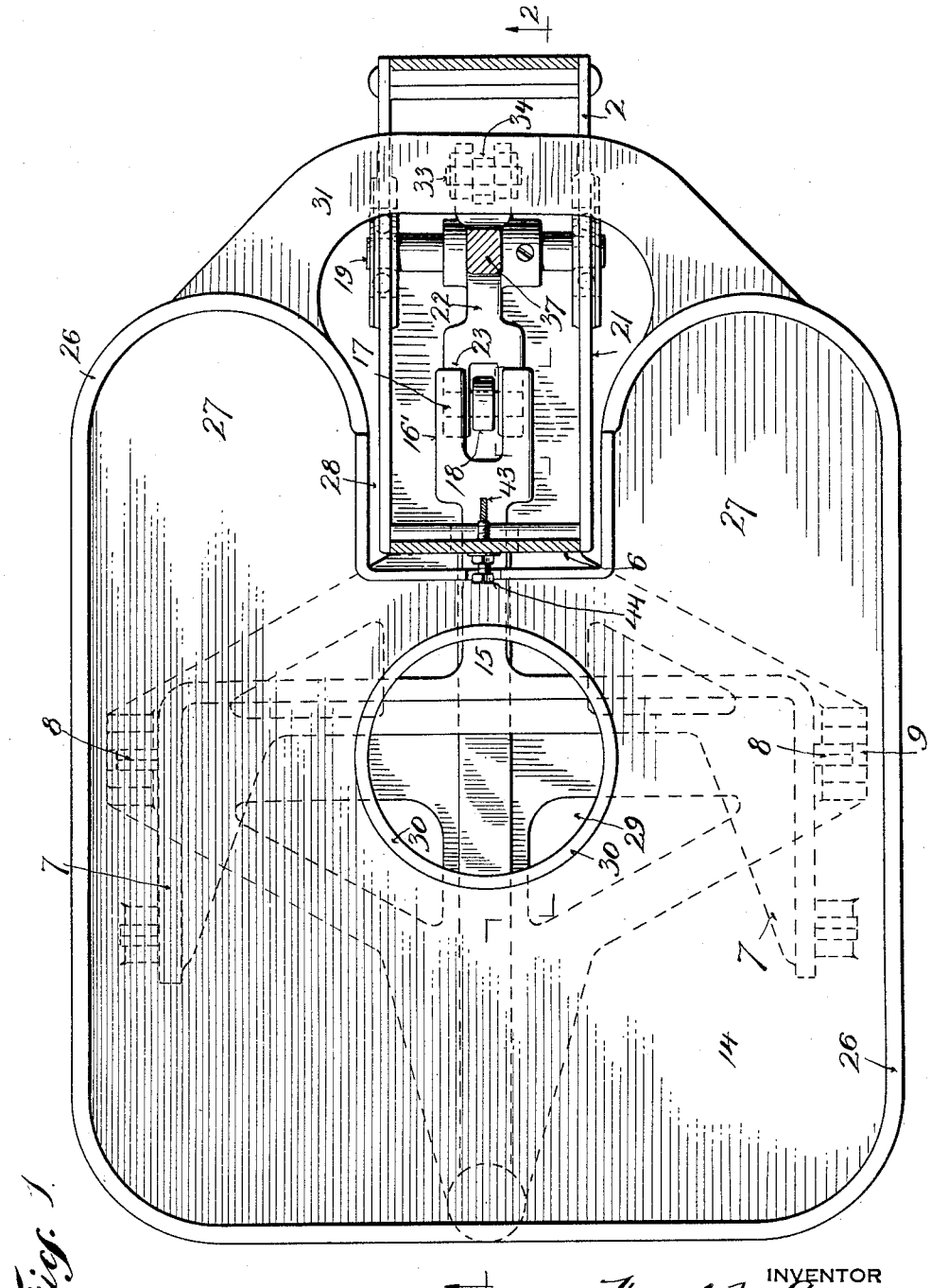

April 18, 1933.  H. M. CAMERON  1,903,955
SCALE
Filed Aug. 7, 1931  3 Sheets-Sheet 1

INVENTOR
Hugh M. Cameron
BY
Charles G. Hensley
ATTORNEY

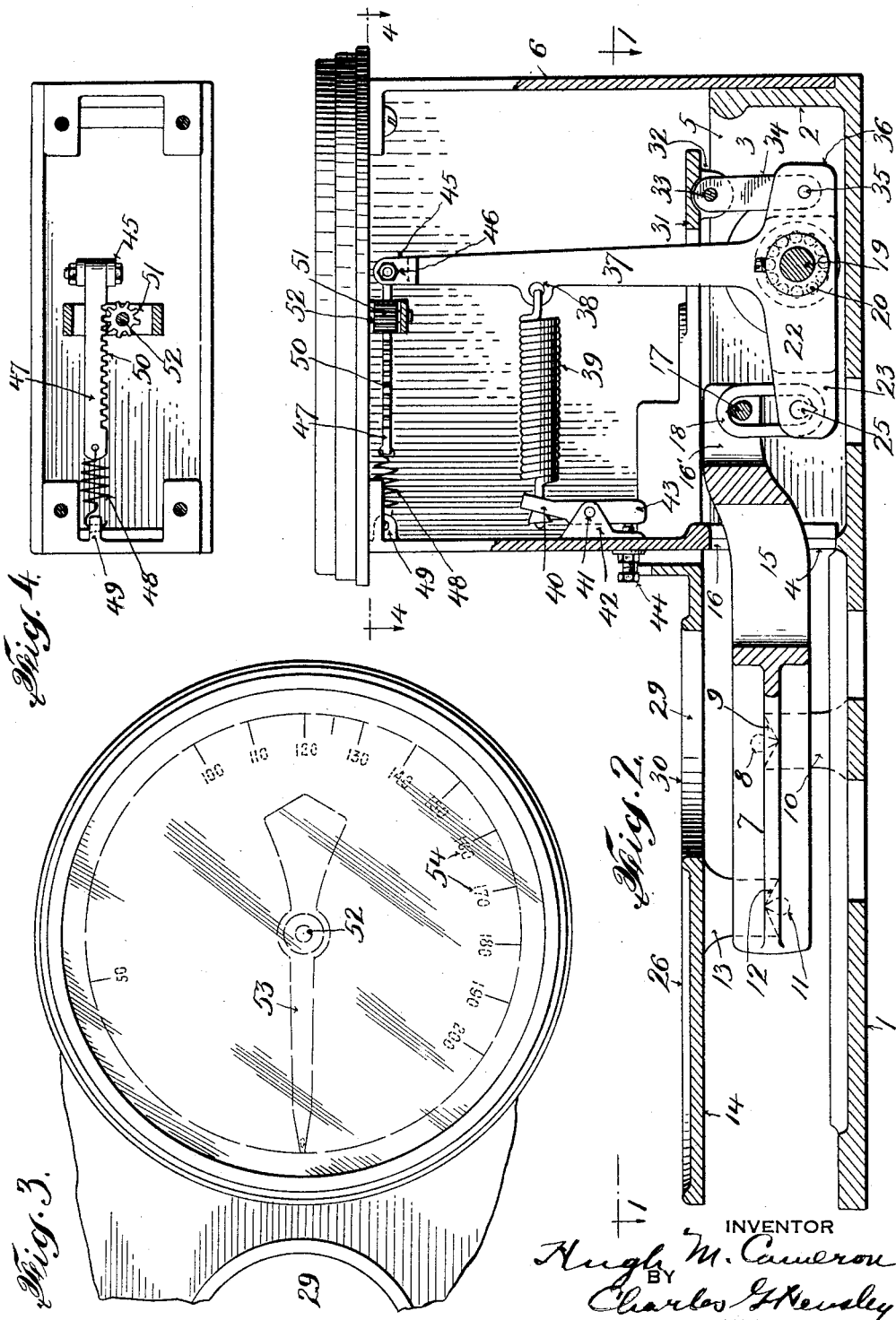

April 18, 1933. H. M. CAMERON 1,903,955
SCALE
Filed Aug. 7, 1931 3 Sheets-Sheet 3
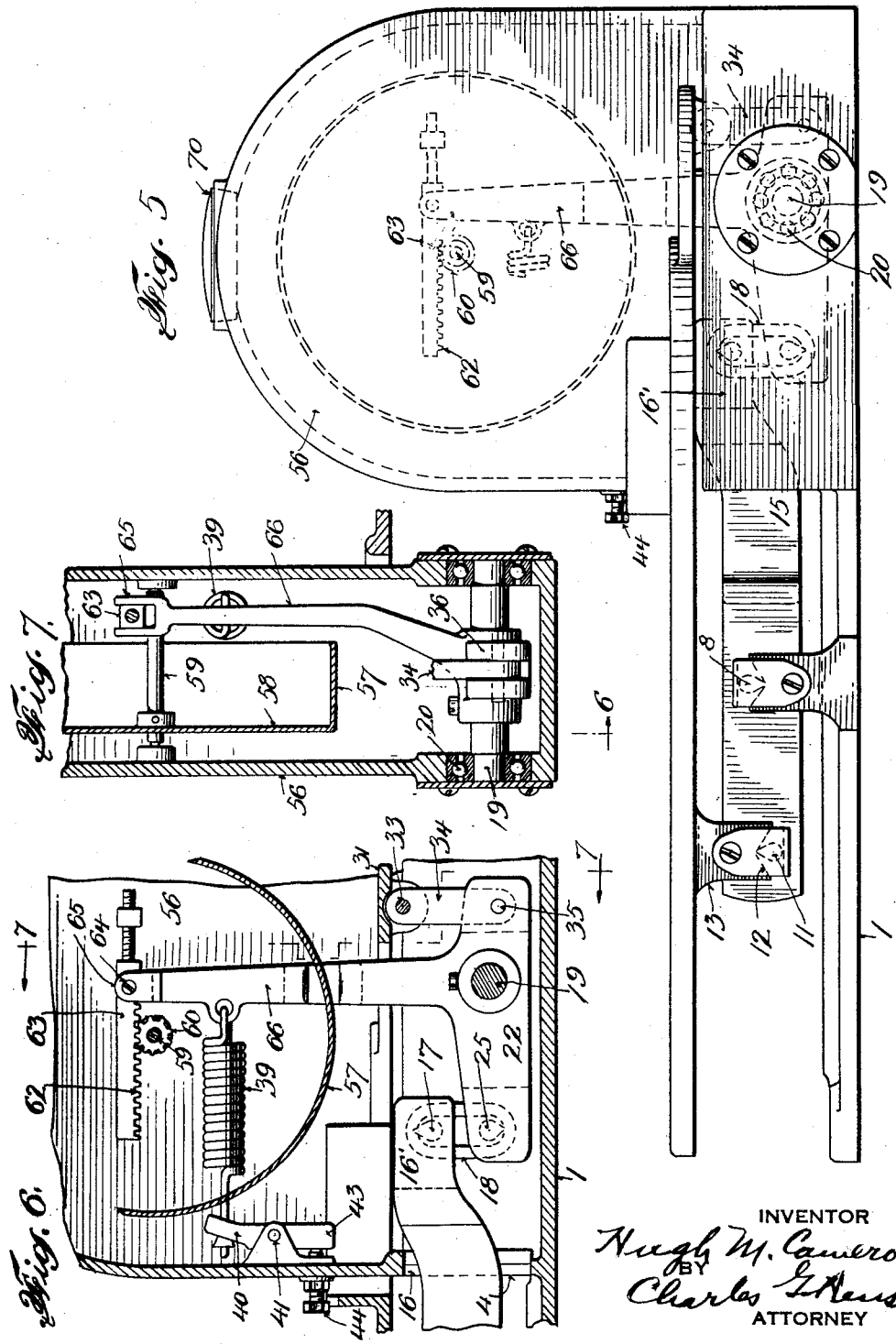

Patented Apr. 18, 1933

1,903,955

UNITED STATES PATENT OFFICE

HUGH M. CAMERON, OF WOODHAVEN, NEW YORK, ASSIGNOR OF ONE-HALF TO EDWARD A. JUDGE, OF NEW YORK, N. Y., AND ONE-HALF TO JACOB E. SEEDERER, OF BLOOMFIELD, NEW JERSEY

SCALE

Application filed August 7, 1931. Serial No. 555,712.

The present invention relates to scales and while the same is not necessarily limited to a particular use, it is nevertheless so designed that it may be advantageously used in the home for weighing persons. The scale is small, compact and light so that it may be readily stored in a small space if necessary, and it will occupy very little space when in use.

One of the objects of the invention is to provide a scale of very simple and compact construction. Another object is to provide a scale the platform of which has a three point support and with the three points of support disposed below the plane of the platform. Another advantage of the present invention is that the same weight will be indicated on the dial regardless of how the weight of the body which is being weighed is distributed on the platform. This feature is accomplished in a scale having the advantages above described. Heretofore it has not been the practice to make small scales of the type herein shown, with a three point support for the platform disposed below the plane of the latter, whereas in the present case I accomplish this result and at the same time employ a very simple construction which permits the scale to be made and sold at a popular price.

In the preferred construction I also employ a ball bearing for the indicator operating lever in order to permit the same to move freely or with the least possible friction. Other parts of the scale may be made with knife edge pivots but the dial operating lever, because of the character of its movements and the stresses applied to it, is preferably supported on ball bearings.

I have shown the present invention embodied in a scale having a dial arranged horizontally, with the indicator revolving in a horizontal plane; and I have also shown the same embodied in a scale, with the dial revolving in a vertical plane. The lever system in both types is the same but either type of dial may be used. Other objects and advantages will be made apparent in the following detailed description of my invention.

In the drawings forming part of this application,

Figure 1 is a horizontal, sectional view through the scale embodying my invention and taken on the line 1—1 of Figure 2, Figure 2 is a vertical, sectional view taken on the line 2—2 of Figure 1, Figure 3 is a plan view of the dial and indicator shown in the previous figures, Figure 4 is a sectional view taken on the line 4—4 of Figure 2, Figure 5 is an elevation of a scale embodying my invention in a modified form wherein the dial is disposed in a vertical plane, Figure 6 is a sectional view taken on the line 6—6 of Figure 7, and Figure 7 is a sectional view taken on the line 7—7 of Figure 6.

I will first describe the form of the invention illustrated in Figures 1 to 4 inclusive. The base or support for the working parts of the scale is shown in the form of a casting comprising a bottom member 1 from which extends upwardly a rear wall 2. I have also shown walls 3 extending upwardly from the bottom member to form supporting means for parts of the mechanism and there is a cross wall 4 interposed between one end of the walls 3 so that a compartment 5 is formed in the base within which part of the operating mechanism of the scale is housed. There is a housing 6 mounted on the base and serving to support the dial and the parts for operating the pointer.

The main or primary lever includes a yoke portion 7 of considerable width and on opposite sides of this yoke, i. e. near the opposite sides of the scale, there are mounted the bearing members or knife members 8 which are arranged to rock in the crotch or V shaped bearings 9 formed on the top of the posts 10 which are cast integral with the base. This yoke also carries the reversely or upwardly projecting bearing members or knife edges 11 on which rest the crotch shaped bearing members 12 formed on the under ends of the posts 13 which are shown as cast integral with the platform 14. The central portion 15 of the main lever projects through the opening 16 in the front wall 4 of the compartment 5. Within this compartment the extension 15 is provided with a yoke 16' in which is mounted crosswise thereof a bearing or knife edge member 17 having its bearing edge directed upwardly.

There is a link 18 which is supported on the edge of the bearing member 17 so that it projects downwardly therefrom, hanging on the bearing member 17.

The dial operating member is mounted in the compartment 5 upon the shaft 19 and the opposite ends of this shaft are mounted by means of the ball bearings 20 in the two walls 21 forming part of the base. One arm 22 of this lever projects substantially horizontally near the bottom wall 1 and toward the front of the scale and it carries a yoke 23 having a bearing or knife edge member 25. This is disposed below and preferably in line with the bearing member 17 and it has a bearing edge which engages in a suitable notch in the lower end of the link 18, this bearing member acting in opposition to the bearing member 17, both acting on the connecting link 18.

The platform, which may be of any particular shape and dimension is shown as a flat plate 14 having a rim or bead 26 extending around the same and it is so shaped as to provide suitable foot rests 27 on opposite sides of the median line of the scale so that a person may stand on the platform with one foot placed on either of the foot rests. Between these portions the platform is provided with a recess or indentation 28 to clear part of the operating mechanism of the scale in order that the overall length of the scale may be as short as possible. I have shown a central aperture 29 in the platform, also surrounded by a bead 30 but this is only formed to make the platform as light as possible and it serves no other particular function.

The platform is provided with a rearward extension 31 projecting backwardly over the top of the compartment 5 to a point in the rear of the axis of the shaft 17. The rearward end of this extension is provided with ears 32 between which there is mounted a shaft 33 on which a link 34 is pivotally connected at one end. This link extends downwardly and at 35 it is pivotally connected with a pin mounted between the arms of the yoke 36 which forms a part of the indicator lever. This yoke is disposed, as will be seen in Figure 2, on the opposite side of the axis of the shaft 19 to that of the link 18 and preferably it is nearer to this axis than the link.

Within the upper casing 6 which forms the housing for the dial and pointer mechanism, I have shown the long arm 37 of the dial or T lever and extending approximately vertically to a point just below the dial. This lever arm is provided with an aperture 38 into which is hooked one end of the counterbalancing, coiled spring 39 and the other end of this spring is connected with one arm of an adjusting lever 40. This lever is pivoted on the pin 41 which is attached to the bracket 42 and the arm 43 of this lever extends downwardly and is engaged by a stop screw 44 which projects through the wall of the upper housing so that it may be manipulated from the exterior of the housing.

The upper end of the lever arm 37 is provided with a fork 45 in which is mounted a bolt 46 to which the rack bar 47 is pivotally connected. One end of this rack bar is connected with a coiled spring 48 and the other end of the spring is connected with a bracket 49. This spring holds the rack bar in position to cause the teeth 50 thereof to mesh with a pinion 51.

The latter pinion is fixed to a shaft 52 vertically disposed and this shaft has mounted upon it the indicator 53 which is housed within the dial casing 6 so that it revolves in a horizontal plane to indicate in relation to the dial 54 the weight of the object resting upon the platform of the scale.

It will be noted that the platform has three points of support, to wit, the two posts 13 which rest on the bearing members 11 carried by the yoke of the main lever and the third point of support is through the link 34 which is connected with the yoke 36 of the dial operating lever. When a body to be weighed rests on the platform, downward pressure is exerted through the posts 13 to the two bearing members 11 which are forward of the bearing members 8 on which the main lever is supported. In addition, downward pressure of the platform and the object resting on it, exerts a downward pressure through the link 34 to the yoke 36 tending to rock the levers 37, 22, 36 clockwise as viewed in Figure 2. Clockwise movement of the last mentioned lever will exert a tension upon the main spring 39. The downward pressure exerted by the platform and its load upon the bearing members 11 will tend to rock the main lever upon its bearing members 10 and the downward pressure of the platform and its load will tend to raise the rear end of this lever, i. e., the yoke 16 thereby causing an upward pressure of the bearing member 17 against the upper end of the link 18. The upward pressure thus exerted through the link 18 will act on the bearing member 25 and the force will act upon the forward end of the arm 22 of the dial operating lever.

The force acting through the parts just described will also tend to move the dial lever clockwise in Figure 2 so that the force will be exerted to extend the main spring 39 the same as the force which acted through the link 34 and the yoke 36.

Should the body which is being weighed be so disposed upon the platform that it is principally to the left of the members 13 in Figure 2, there will be a tendency for all of the weight to act on the left hand end of the platform and the extension 31 of the platform may in that case exert an upward pull upon the link 18 rather than a downward push. In such case, however, the resulting action on the dial operating lever will be the same; that is to say, the same effect will be produced upon the pointer, provided, of course, a body of a given weight is applied to the platform. In other words, any distribution of the weight on the platform will produce the same result upon the pointer.

To prepare the scale for use, the adjusting screw 44 will be turned to act on the lever arm 43 for the purpose of moving the arm 40 and this will adjust the position of the lever arm 37 to bring the pointer 53 into zero position in relation to the dial 54. Assuming a body to be weighed is placed on the platform of the scale, the force will act in either one of the ways above described, according to its disposition upon the platform. As the lever arm 37 moves clockwise in Figure 2 as a result of the body placed on the platform, this arm will carry with it the rack bar 47 and the teeth of this bar will act on the pinion 51 to revolve the shaft 52.

As the pointer 53 is attached to this shaft it will revolve in relation to the dial 54 and when the mechanism has come to rest the pointer will stop at one of the divisions or subdivisions on the dial and indicate the weight of the body resting on the platform. The main spring 39 resists the movement of the lever arm 37 or counterbalances the force of the object on the platform and when equilibrium is established the position of the pointer 53 in relation to the dial 54 will indicate the weight of the object. When the object is removed from the platform the parts will automatically return to zero position under the action of the main spring 39. When the parts so return, the lever arm 37 will move the rack bar 47 in the reverse direction to that previously described. This will revolve the pinion 51 and the shaft 52 so that the pointer 53 will return to zero position.

The downward pressure of the platform and the body being weighed will exert downward pressure through the posts 13 upon the bearing members 11 which are carried by the yoke 7 of the main lever. These bearing members 11 being disposed at one side of the posts 10 on which the bearing members 8 rest, the downward presure exerted through the posts 13 tends to lift the rear portion 15 of the main lever. The bearing member 17, therefore, presses upwardly on the link 18 and the latter presses upwardly on the bearing member 25 which is mounted in the yoke 23 on the end of the lever arm 22. This causes the dial operating lever to revolve clockwise as viewed in Figure 2. Downward pressure of the platfrom and its load also causes the rear extension 31 of the platform to press downwardly on the link 34 and this pressure is transmitted through this link and the pin 35 to the yoke 36.

The latter represents a lever arm disposed on the opposite side of the shaft 19 to that of the lever arm 22. The downward pressure exerted through the link 34, in the manner just described, on the yoke 36 tends also to rock the dial lever clockwise in Figure 2, the same as the upward pressure exerted through the link 18. The operations just described are based on the assumption that the body to be weighed is so disposed on the platform that both the front and rear portions of the latter are pressed downwardly. If, however, the body which is being weighed is disposed on the platform with its center of gravity to the left of the bearing member 11 in Figure 2, the platform as a whole will tend to rock upon the bearing members 11 as a fulcrum so that the rear extension 31 of the platform will tend to rise. In other words, if the body is disposed only on the front end of the platform the latter will tend to rock on the bearing members 11 and the extension 31 will exert an upward pull on the link 34. This upward pull exerted through the link 34 upon the yoke 36 will tend to move the dial lever anticlockwise in Figure 2. This force will be opposed, however, by the downward pressure on the bearing members 11 which tends to rock the rear fork 16 upwardly and through the link 18 to rock the lever arm 22 upwardly. This latter force will overcome the force acting upwardly through the link 34 and it will cause the lever arm 37 to move clockwise in Figure 2. Assuming that a body of the same weight is applied to the platform in both operations described above, the pointer 53 will be moved to the same position in relation to the dial, notwithstanding that in one case the extension 31 of the platform exerts a downward pressure, whereas in the other it exerts an upward pressure upon the yoke 36.

In the first instance, the body being weighed is assumed to be positioned with its center of gravity somewhere between the vertical planes of the posts 13 and the pin 33. In the second instance the body is disposed with its center of gravity to the left of the bearing members 11 in Figure 2. In the latter case the disposition of the body to the left of the bearing members 11 has greater leverage in relation to the fulcrum represented by the bearing members 8 of the main lever, so that the upward pressure of the yoke 16 is sufficiently increased by this change of leverage to offset the upward pull exerted through the link 34 and to produce the same reading of the pointer on the dial as is produced when the body is disposed on the platform so that its center of gravity falls somewhere between the bearing members 11 and the pins 33 and 35.

It will be apparent from the above description that I am enabled to secure all the advantages of the three point support of the platform with the three points of support disposed below the plane of the platform and to secure uniform operation of the scale regardless of the disposition of the load upon the platform.

The advantage of the three point support is that the scale will weigh accurately regardless of whether it is resting on an even or level support. Even though a floor may appear to the eye to be level and smooth there are very often irregularities which will affect the accuracy of the scale unless it is of the three point support type. In the present case such inaccuracies are avoided and at the same time the scale is made in compact form.

It is preferable to space the pin 35 from the center of the shaft 19 a distance which is one half the distance between the axis of the shaft 19 and the bearing member 25. This will so proportion the leverage as to produce the results described above.

In Figures 5 to 7 I have shown a scale provided with a vertically disposed and revolving dial which revolves in a vertical plane. In this construction the platform, the main lever and the T lever with their various associated parts are constructed and operated and are similarly lettered to the first described form. 56 indicates a vertically disposed casing for containing the dial 57 which is of annular shape and which may be viewed through an opening 70 at the top of the casing 56. The disk 58 on which the dial 57 is formed or mounted is disposed in a vertical plane and is attached to and revolves with the shaft 59 which has its bearings in the walls of the casing 56. The shaft 59 is horizontal. There is a pinion 60 mounted on and attached to the shaft 59 and the rack bar 63 has teeth 62 which mesh with the teeth of the pinion 60. The rack bar 63 is pivotally connected by means of a screw 64 with the upper forked end 65 of the lever arm 66 which corresponds with the lever arm 37 in the first described form of the invention. All other parts of the scale not specifically described, correspond with the form of scale previously described.

It will be apparent that when the lever arm 66 rocks in the same manner as the lever arm 37, it will move the rack bar 63 and cause the pinion 60 to revolve in the same manner as the pinion 51 was revolved in the first form of the invention.

The turning of the pinion 60 will cause the shaft 59 to revolve and it will carry with it the member 58 and also the dial member 57. A suitable mark on the fixed portion of the casing 56 will co-operate with the dial markings on the dial 57 to indicate the weight of the object resting on the platform of the scale.

It will be apparent from the above description and drawings that I have provided a very compact and simple scale of the platform type having three points of support below the plane of the platform. The scale is very light so that it may be very readily moved about. While I have described in great detail certain embodiments of my invention I do not wish to limit myself to the specific constructions herein shown and described but to include all modifications and variations coming within the scope of the following claims.

Having described my invention what I claim is:

1. In a scale the combination of a platform, a lever of the first class disposed below the plane of the platform, means forming two points of support for said lever below the plane of the platform, means forming points of support for said platform on one arm of said lever, a T lever supported below the plane of the platform, means for connecting one arm of said first mentioned lever with one arm of said T lever, and means for connecting a portion of the platform with another arm of said T lever below the plane of said platform, counterbalancing means associated with said T lever and means for indicating the weight of a body resting on said platform.

2. In a scale the combination of a platform, a lever of the first class disposed below the plane of the platform, means forming pivotal supports for said lever below the plane of the platform, a T lever pivotally supported below the plane of the platform and having arms extending in opposite directions from the axis of said T lever, means for connecting one arm of said first mentioned lever with one of said arms of the T lever and means for pivotally connecting a portion of the platform with the oppositely extending arm of said T lever below the plane of said platform, said T lever including an upwardly extending arm counterbalancing means associated therewith and means for indicating the weight of a body resting on said scale.

3. In a scale the combination of a platform, a lever of the first class disposed below the plane of the platform, means forming a pivotal support for said lever below said platform, means forming a pivotal connection between the platform and said lever in front of the fulcrum of said lever, a T lever pivotally mounted below the plane of said platform and having arms extending forwardly and rearwardly of its axis, means for pivotally connecting an arm of said first mentioned lever with one of the arms of said T lever on the rear side of the fulcrum of said first mentioned lever, and means for pivotally connecting a portion of the platform with the oppositely extending arm of said T lever, counterbalancing means associated with another arm of said T lever, and means indicating the weight of a body resting on said platform.

4. In a scale the combination of a platform, a lever of the first class disposed below the plane of the platform, a plurality of spaced bearing members forming a fulcrum for said lever below the plane of the platform, a plurality of spaced members forming two points of pivotal support for said platform on said lever on one side of its fulcrum, a T lever pivotally mounted and having arms extending forwardly and rearwardly of its axis, means for pivotally connecting one arm of said first mentioned lever with the forwardly extending arm of said T lever and means for pivotally connecting a portion of the platform with the rearwardly extending arm of said T lever, counterbalancing means associated with another arm of said T lever and means associated with the T lever for indicating the weight of a body resting on said platform.

5. In a scale the combination of a platform, a lever of the first class disposed below the plane thereof, spaced bearing members forming a fulcrum for said lever, spaced bearing members forming two points of pivotal support for said platform on said lever on one side of the fulcrum thereof, a pivotally mounted T lever having arms extending forwardly and rearwardly of its axis, means for pivotally connecting the rear arm of said first mentioned lever with the forwardly extending arm of said T lever, means for connecting a portion of said platform pivotally to the rearwardly extending arm of said T lever whereby upward or downward pressure of the latter portion of said platform will exert upward or downward pressure on the arm of the T lever, counterbalancing means associated with another arm of said T lever and means for indicating the weight of a body resting on said platform.

6. In a scale the combination of a platform, a lever of the first class disposed below the plane of the platform, means forming a fulcrum for said lever below the plane of the platform, pivotal means for supporting a portion of the platform on one arm of said lever and below the plane of the platform, a T lever pivotally supported below the plane of the platform and having an arm extending forwardly of its axis and an arm extending rearwardly of its axis, said latter arm being relatively shorter than the forwardly extending arm, means for pivotally connecting one arm of said first mentioned lever with the forwardly extending arm of said T lever and means for pivotally connecting a portion of the platform with the rearwardly extending arm of said T lever, counterbalancing means associated with another arm of said T lever and means for indicating the weight of a body resting on said platform.

7. In a scale the combination of a platform, a lever of the first class disposed below the plane thereof, means forming a fulcrum for said lever, means forming two pivotal points of support for said platform on one arm of said lever, a T lever mounted below the plane of the platform and having an arm extending forwardly of its axis and another arm extending rearwardly of its axis, means for pivotally connecting one arm of said first lever with the forwardly extending arm of the said T lever, a link for pivotally connecting a portion of the platform with the rearwardly extending arm of said T lever, counterbalancing means associated with another arm of said T lever and means for indicating the weight of a body resting on said platform.

8. In a scale the combination of a platform, a lever of the first class disposed below the plane of the platform, means forming a fulcrum for said lever below the plane of the platform, means for forming a pivotal support for a portion of the platform on one arm of said lever, said lever having another arm extending rearwardly of its fulcrum, a T lever fulcrumed below the plane of the platform and having an arm extending forwardly of its axis and another arm extending rearwardly of its axis and shorter than said forwardly extending arm, means for pivotally connecting the rearwardly extending arm of said first lever with the forwardly extending arm of said T lever, said means including a link, a pivotal link for connecting the rear portion of said platform to the rearwardly extending arm of said T lever, counterbalancing means associated with another arm of said T lever and means for indicating the weight of a body resting on said platform.

9. In a scale the combination of a base, a platform, a lever of the first class disposed below the plane of the platform, means on said base for forming a fulcrum for said lever, means forming two points of support for a portion of said platform on one arm of said lever, a housing arranged over the rear end of said base, said lever having one arm extending into said housing, a T lever pivotally mounted in said housing below the plane of the platform, said T lever having a forwardly extending arm, means for pivotally connecting the rearwardly extending arm of said first lever and the forwardly extending arm of said T lever, an extension of said platform extending into said casing, means for pivotally connecting said latter portion of the platform with a rearwardly extending arm of said T lever, said T lever having an upwardly extending arm in said housing, counterbalancing means in said housing associated with said upwardly extending arm and means disposed in said housing for indicating the weight of a body resting on said platform.

Signed at the city, county and State of New York this 2nd day of April, 1931.

HUGH M. CAMERON.